Figure 1:
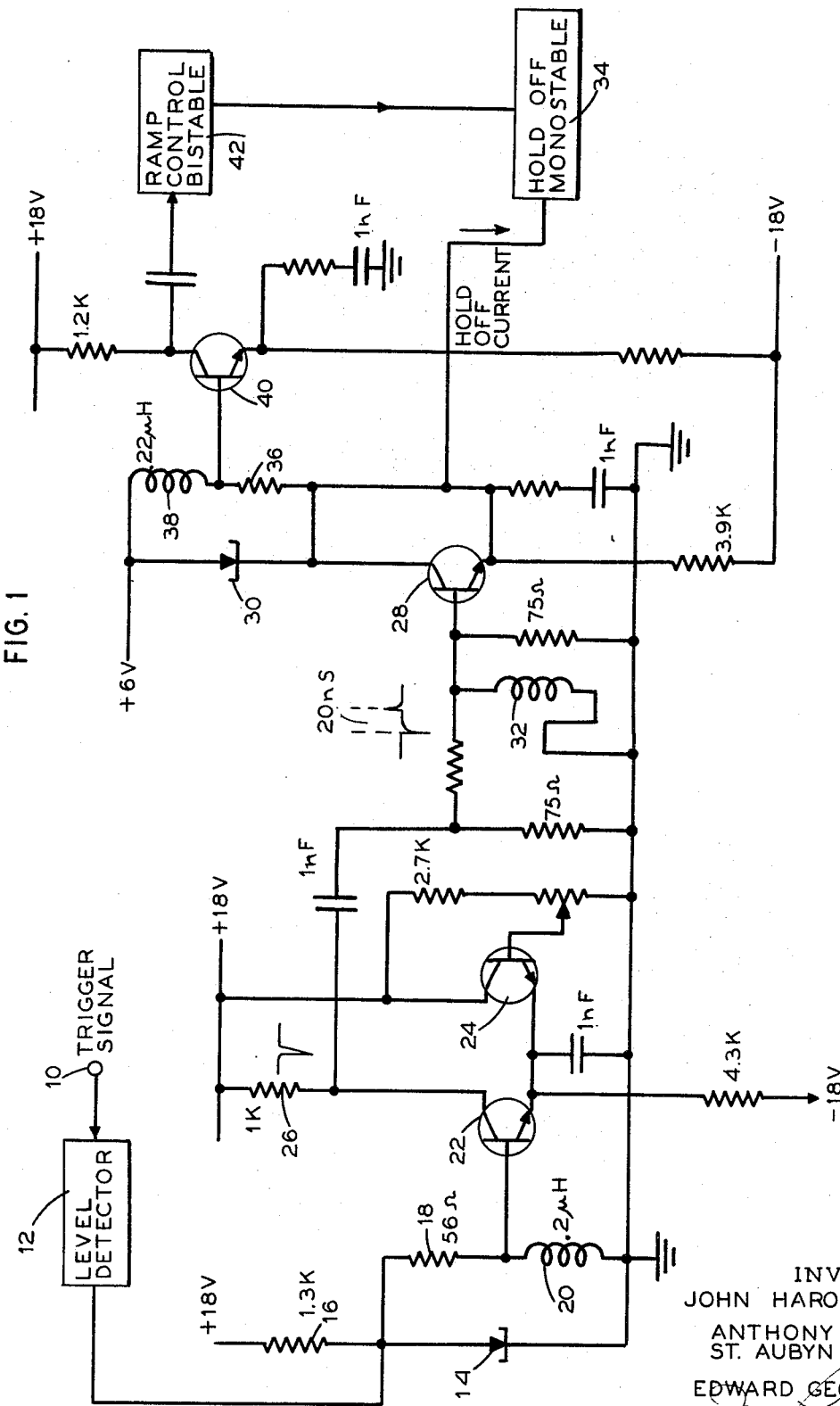

United States Patent
Conrad et al.

[15] 3,676,707
[45] July 11, 1972

[54] JITTER FREE TRIGGER PULSE GENERATOR

[72] Inventors: John Harold Conrad; Anthony Edward St. Aubyn Reynolds; Edward George Gadd, all of Farnborough, England

[73] Assignee: The Solartron Electronic Group Limited, Farnborough, England

[22] Filed: March 10, 1971

[21] Appl. No.: 122,876

[30] Foreign Application Priority Data

March 12, 1970 Great Britain..................11,998/70

[52] U.S. Cl..................307/260, 307/228, 307/262, 307/264, 307/286, 307/293, 307/322
[51] Int. Cl..................H03k 5/00, H03k 3/315
[58] Field of Search..................307/293, 228, 260, 262, 264, 307/286, 322, 247; 328/59, 60, 61, 181, 185

[56] References Cited

UNITED STATES PATENTS

| | | | |
|---|---|---|---|
| 3,530,315 | 9/1970 | Kaufman | 307/293 X |
| 3,558,930 | 1/1971 | Knapton et al. | 307/228 X |
| 3,096,445 | 7/1963 | Herzog | 307/286 X |
| 3,350,576 | 10/1967 | Zimmerman | 307/273 X |
| 3,358,159 | 12/1967 | Smith | 307/228 |
| 3,359,429 | 12/1967 | Zimmerman | 307/228 X |
| 3,408,580 | 10/1968 | Moriyasu | 307/228 X |
| 3,524,993 | 8/1970 | Frye | 307/228 |

Primary Examiner—Stanley D. Miller, Jr.
Attorney—William R. Sherman, Stewart F. Moore, Jerry M. Presson, Leonard R. Fellen and Roylance, Abrams, Berdo & Kaul

[57] ABSTRACT

In a trigger pulse generator for an oscillator jitter is liable to occur in the trigger pulses because of uncertainties in the timing of the end of the hold-off signal relative to the instants at which a trigger signal reaches a trigger level. Jitter is eliminated by arming an output circuit when the hold-off signal ends and a first pre-trigger pulse is generated in response to the trigger signal reaching the trigger level.

The output circuit generates a trigger pulse, when it is armed, in response to a second pre-trigger pulse which is generated in timed relation to the trigger signal reaching the same trigger level, either that is by delaying the first pre-trigger pulse a predetermined amount or by generating the first and second pre-trigger pulses off opposite going edges respectively of the squared trigger signal.

4 Claims, 2 Drawing Figures

JITTER FREE TRIGGER PULSE GENERATOR

This invention relates to a trigger pulse generator of the kind which provides trigger pulses in response to selected cycles only of a periodic signal, which will be called the trigger signal, and in response to the trigger signal attaining a trigger level in the selected cycles.

The pulse generator can also be used, in known manner, with an aperiodic or one-shot trigger signal, but this is a distinction relating to the use, rather than the construction of the circuit and for simplicity, all further description is given in terms of a periodic trigger signal. A trigger pulse generator has its primary field of application in triggering the horizontal time base circuit of an oscilloscope. The generation of trigger pulses in intervening cycles is prevented by a hold-off signal of predetermined duration. The falling edge of this signal can also be called the rising edge of an arming signal which arms the generator so that it can generate a trigger pulse when the trigger signal next attains the trigger level. The terms falling and rising are used in a logical connotation, not to imply any particular signal polarities. If pulses, which will be called pre-trigger pulses, are derived from the trigger signal every time it reaches the trigger level, it can be arranged to provide a trigger pulse from a pre-trigger pulse only when the arming signal has arrived. The hold-off signal is then re-established. These techniques are well known in themselves and the effect is that a trigger pulse is generated for every N'th pre-trigger pulse where N is a integer determined by the length of the hold-off signal.

The rising edge of the arming signal is not however a sharp edge positioned clearly in between two pre-trigger pulses. In practical circuits, it appears, at the frequency of the pre-trigger pulses, as a slow edge or ramp which is furthermore subject to some time-positional variation with respect to the N'th pre-trigger pulse. The generator is conjointly responsive to the arming signal and the N'th pre-trigger pulse to generate the trigger pulse and, whatever the actual circuit employed, the situation can be regarded as if the pre-trigger pulses are superimposed on the arming ramp and a trigger pulse is generated when the composite signal reaches a trigger level. The N'th pre-trigger pulse necessarily has finite width and, in the above described situation, it is variably positioned on a ramp. There is then necessarily jitter in the time at which the composite signal reaches the trigger level and hence in the time of the resulting trigger pulse. The spread of the jitter is of the order of the pre-trigger pulse width. This jitter leads to an unstable display in an oscilloscope, and if excessive can cause the integer N to vary.

It has already been proposed to overcome the problem of jitter by using the hold-off circuit to arm a first trigger circuit which, when it triggers, arms a second trigger circuit. The two circuits have different trigger levels, whereby there is a delay between the two circuits firing. Although there will be jitter in the timing of the first circuit, if the delay is suitable, the jitter will be substantially eliminated when the second circuit fires. However the length of the delay is a function of the difference between the trigger levels and of the frequency and waveform of the trigger signal. The latter factors are obviously variable and it is necessary to provide controls for adjusting both trigger levels to get reliable operation for any given trigger signal. The adjustment of these controls is tedious and readjustments have to be effected frequently, making the oscilloscope troublesome to use.

The object of this invention is to provide an improved trigger pulse generator which will substantially reduce the jitter without expensive circuit complications.

The invention is characterized by a pre-trigger circuit responsive to the trigger signal to generate pairs of first and second pre-trigger pulses, the timing of both of which is determined in relation to passage of the trigger signal through the same threshold level and which respectively switch the two state circuit and cause the output circuit to provide the trigger pulse.

Although, for the reasons explained above, there will be jitter in the timing of the said switch from the first state to the second state, the timing of the trigger pulse is determined solely by the timing of the second pre-trigger pulse, assuming that the two-state circuit has settled properly within the predetermined delay. This is what is meant by saying that this circuit switches rapidly.

In one embodiment the pre-trigger circuit is responsive to the trigger signal to generate a first pre-trigger pulse followed after a predetermined delay by a second pre-trigger pulse, each time the trigger signal attains the threshold level.

In a particular example of this embodiment of the invention, the second pre-trigger pulse resets the two-state circuit to its first state, the output circuit responding to this resetting to yield the trigger pulse.

It is necessary for the two-state circuit to distinguish between first and second pre-trigger pulses. It is preferred to achieve this by making these pulses of opposite polarity and one way of generating such pulses is to obtain the first pre-trigger pulse conventionally and to feed this forward and also to a short-circuited delay line which reflects back an inverted pulse. The delay between the second and first pulses is then a pre-determined amount equal to twice the delay time of the delay line. A tunnel diode can be used as the two-state circuit. The fast switching times of such diodes are well known. If opposite polarity pre-trigger pulses are used it can be arranged that the first turns the diode "off" and the second turns it "on" or vice versa while the hold-off circuit feeds current into the diode to keep it "on," or biases it "off" for the duration of the hold-off signal, as the case may be.

In a second embodiment of the invention the pre-trigger circuit is responsive to the trigger signal to generate first and second pre-trigger pulses when the trigger signal passes through the threshold level in opposite directions respectively.

Thus the trigger signal can be squared and the pre-trigger pulses can be generated off the squared signal by differentiating means.

The invention in both embodiments has the common feature that the first and second pre-trigger pulses are both timed in relation to passage of the trigger signal through the same preset level, either because there is a predetermined delay between the first and second pulse of each pair, or because the first and second pulses occur when the trigger signal goes through the same threshold level in opposite directions respectively. This has the advantage that the operation of the circuit is substantially un-influenced by changes in the waveform or frequency of the trigger signal.

Figure 2:
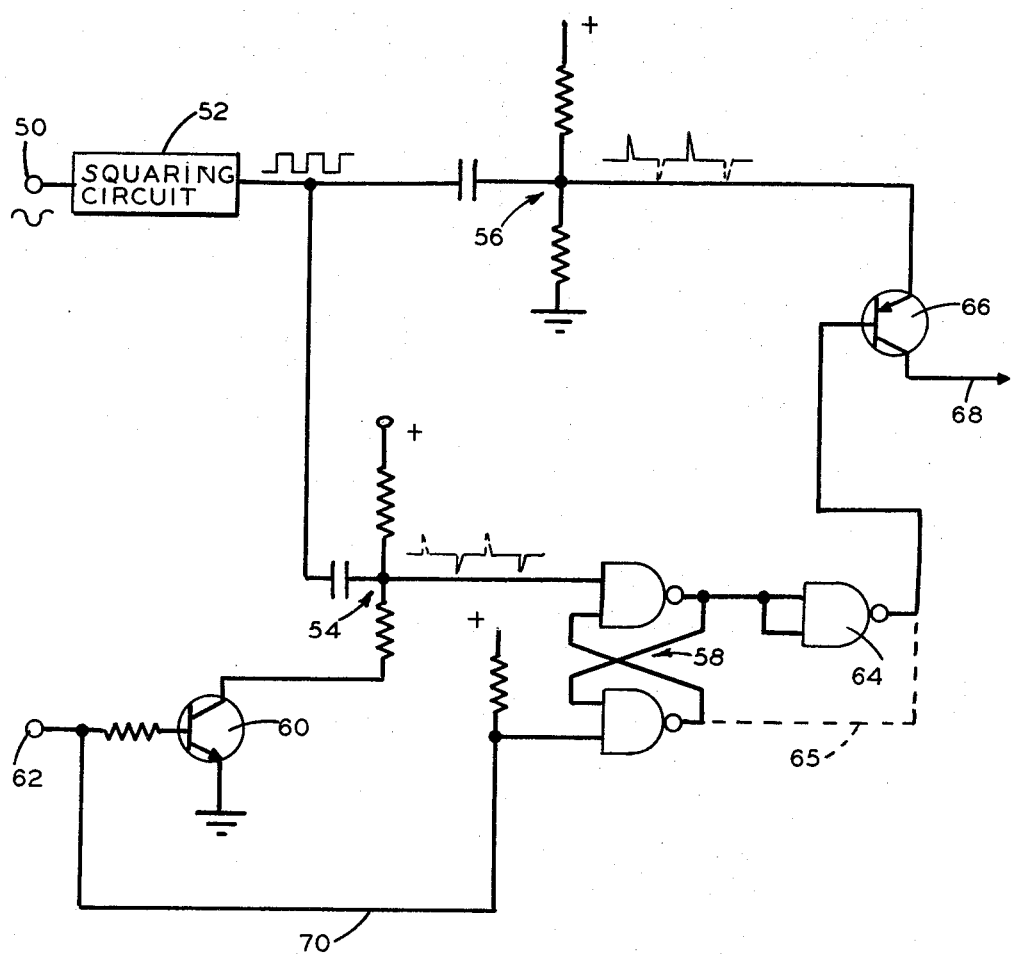

The invention will be described in more detail, by way of example, with reference to the accompanying drawing, in which FIG. 1 is a circuit diagram partly in block form, of one embodiment and FIG. 2 is a block diagram of another embodiment.

In FIG. 1, the trigger signal, which is typically the signal to be displayed on an oscilloscope, is applied at input 10 to a level detector 12 which feeds current into a tunnel diode 14 for that portion only of a cycle when the trigger signal exceeds a preset level, which is adjustable in known way. The tunnel diode is normally biased into the low or "off" state by resistors 16 and 18 but conducts during the said portion of a cycle to generate a relatively broad positive pulse. This is differentiated to produce sharp positive and negative pulses by the resistor 18 and an inductor 20. These pulses are applied to a transistor 22 normally biased to a non-conductive state by a further transistor 24. The negative pulses merely drive the transistor 22 further into the cut-off state and are thus rejected but the positive pulses render this transistor conductive and produce negative pulses across a load resistor 26. These pulses are the first pre-trigger pulses and are fed forward to a transistor 28 in series with a tunnel diode 30, which is normally conducting. The first pre-trigger pulses are also fed into a 10 nS delay line 32 which is short-circuited and therefore reflects positive pulses delayed 20 nS with respect to the first pre-trigger pulses and constituting the second pre-trigger pulses.

The first pre-trigger pulses reduce the current flowing in the transistor 28 and therefore tend to switch the tunnel diode 30 to its non-conducting state. However, the tunnel diode is normally kept conducting by the current drawn by a hold-off monostable 34. At the end of the hold-off period, the monostable 34 ceases to draw this current and the next first pre-trigger pulse cuts off the diode 30. There is jitter in the timing of this occurrence because of the relatively slow resetting of the monostable, producing the effect of a ramp described above. However, the diode 30 is promptly rendered conductive again by the ensuing second pre-trigger pulse and this operation is substantially jitter-free in relation to the timing established by the pre-trigger pulses.

When the tunnel diode 30 thus conducts, it provides a negative-going pulse across a resistor 36 and inductor 38 which differentiate the pulse to generate a trigger pulse. This pulse is amplified by a transistor 40 and applied to set a ramp-control bistable 42 which starts the horizontal deflection ramp generator of the oscilloscope in known way and is reset at the end of the ramp. In addition, when the bistable 42 sets, it sets the hold-off monostable 34 therefore to keep the tunnel diode 30 conductive and so establish the next hold-off period.

In the second embodiment shown in FIG. 2 the trigger signal applied to an input terminal 50 is squared by a squaring circuit 52 to produce a square wave trigger signal which is applied to two differentiating circuits 54 and 56. These both produce positive and negative pulses from the rising and falling edges respectively of the square wave trigger circuit, but the circuits (described below) connected to the differentiating circuits are such that only the negative pulses produced by the differentiating circuit 54 are of any effect and constitute the first pre-trigger pulses, while only the positive pulses produced by the differentiating circuit 56 are of any effect and constitute the second pre-trigger pulses. The first and second pre-trigger pulses are generated when the trigger passes through zero level in the positive-going and negative-going directions and the second pulses are delayed relative to the first by one half of a cycle of the trigger signal.

The output of the differentiating circuit 54 is applied to a bistable circuit 58, illustrated as being constructed in known manner from a pair of cross-coupled NAND gates. One resistor of the differentiating circuit 54 is connected to the collector of a transistor 60 to whose base the hold-off signal is applied via terminal 62. The hold-off signal is low and keeps the transistor 60 conductive, whereby the negative first pre-trigger pulses are unable to set the bistable circuit 58. At the end of the hold-off signal, the terminal 62 goes high, cutting off the transistor 60. The next first pre-trigger pulse sets the bistable 58 whose output then enables, via an inverter 64, a gate 66 constituted by a transistor to whose emitter the differentiator 56 is connected. Alternatively, the inverter 64 can be replaced by the connection 65 shown in broken lines. The transistor 66 is cut off so long as the bistable circuit 58 is reset but, when the bistable circuit is set, the next second trigger pulse passes through the transistor to an output 68 to constitute the trigger pulse. This may be used as described in relation to FIG. 1, in particular to trigger a hold-off monostable (not shown in FIG. 2) which re-establishes the hold-off signal and thereby resets the bistable circuit 58 via a connection 70.

What is claimed is:

1. A trigger pulse generator comprising the combination of means responsive to an input trigger signal for producing a first pre-trigger signal;
delayed trigger means responsive to the input trigger signal for producing a delayed second pre-trigger signal;
bistable circuit means responsive to both said first pre-trigger signal and said delayed second pre-trigger signal for producing an output signal whereby said bistable circuit means changes from a first stable state to a second stable state upon receipt of said first pre-trigger signal and changes from a second to a first stable state upon receipt of said delayed second pre-trigger signal and wherein said bistable circuit means produces said output trigger signal coincident with each change from said second to said first change of state;
holding circuit means responsive to said output signal for holding said bistable circuit means in said first stable state for a predetermined interval following the preceding output signal.

2. A trigger pulse generator in accordance with claim 1 wherein said bistable circuit means comprises a three element semi-conductor transistor wherein said transistor produces said output trigger upon receipt of both said first pre-trigger signal and said delayed second pre-trigger signal.

3. A trigger pulse generator according to claim 1 wherein said bistable circuit means comprises a tunnel diode which is held in said first stable state by said holding circuit means, is changed from said first stable state to said second stable state by said first pre-trigger pulse occurring at the end of the hold-off signal, and is changed from said second stable state to said first stable state by said delayed second pre-trigger pulse wherein said bistable circuit produces said output trigger signal coincident with each change from said second to said first change of state.

4. A trigger pulse generator according to claim 1 wherein said delayed trigger means comprises a delay line for reflecting the first pre-trigger pulses down the delay line to obtain the second pre-trigger pulses.

* * * * *